UNITED STATES PATENT OFFICE.

SALIM NICHOLAS SAMAHA AND HALIM NICHOLAS SAMAHA, OF WASHINGTON, DISTRICT OF COLUMBIA.

FOOD COMPOUND.

1,102,607. Specification of Letters Patent. Patented July 7, 1914.

No Drawing. Application filed November 25, 1913. Serial No. 802,898.

*To all whom it may concern:*

Be it known that we, SALIM NICHOLAS SAMAHA and HALIM NICHOLAS SAMAHA, both subjects of the Sultan of Turkey, and citizens of Syria, Province of Mt. Lebanon and town of Alcanchara, now residing at 1100 Ninth street northwest, Washington, District of Columbia, have invented a new and useful Food Compound, of which the following is a specification.

Our invention consists of the following ingredients, prepared and combined substantially as hereinafter specified, and in such proportions as hereinafter stated, or in such other proportions as may be found convenient and satisfactory:—viz:

| | |
|---|---|
| Figs | 1 lb. |
| Sugar | ½ lb. |
| Nut kernels | ¼ lb. |

In preparing the above named compound, the figs are first prepared by slicing or otherwise dividing them into comparatively small fractions, so that the sugar may, when dissolved, thoroughly permeate therethrough, and so that the nut kernels may be thoroughly intermixed with fig pulp, seeds and juices; and now the figs, sugar and nut kernels may be placed in a suitable boiler, together with a suitable quantity of water, and the whole may be boiled until a thorough mixture has been obtained, and of the proper consistency to constitute a jam, marmalade or preserves in a soft and plastic or semi-liquid state.

Instead of preparing the compound as specified in the foregoing, the divided figs may be put into a previously prepared syrup of sugar and water, and the nuts may be added after the boiling has been completed, together with any desirable flavoring substance, such as spices, fruits or the essence or extract of spices or fruits. Instead of sugar or sugar-syrup, we may employ honey, glucose, cane syrup, molasses or any other saccharin food substance; and, in order to cheapen the compound, we may add tomatoes or other food-vegetables.

The nuts which we contemplate using in this compound are known in Syria as "snobar," and resemble the piñon nuts known in this country, and it is to be understood that we may use said piñon nuts, with or instead of the "snobar" nuts; and it is also to be understood that we may use any desirable nut kernels either whole or divided.

We claim as our invention:

1. A food compound consisting of cooked figs and sugar and nut kernels mixed together in suitable proportions.

2. A food compound consisting of divided and cooked figs and nut kernels mixed and incorporated in saccharin food material.

3. A food compound consisting of divided and cooked figs and cooked in saccharin liquid, and snobar nut kernels mixed with the said figs and saccharin liquid.

4. In a food compound a cooked mixture of figs and saccharin matter and nut kernels.

5. In a food compound, a cooked mixture of divided figs and saccharin matter, and undivided nut kernels intermixed with said cooked mixture.

6. In a food compound, a cooked mixture of figs and honey, and nut kernels intermixed with said cooked mixture.

SALIM NICHOLAS SAMAHA.
HALIM NICHOLAS SAMAHA.

Witnesses:
WILLIAM F. HORSTKAMP,
LOUIS E. DE MORELAND.